(12) United States Patent
Young et al.

(10) Patent No.: US 7,825,642 B1
(45) Date of Patent: Nov. 2, 2010

(54) CONTROL SYSTEM OPTIMIZATION VIA INDEPENDENT PARAMETER ADJUSTMENT

(75) Inventors: Chris M. Young, Austin, TX (US); Douglas E. Heineman, Lakeway, TX (US); Gregory T. Chandler, Austin, TX (US)

(73) Assignee: Zilker Labs, Inc., Austin, TX (US)

( * ) Notice: Subject to any disclaimer, the term of this patent is extended or adjusted under 35 U.S.C. 154(b) by 143 days.

(21) Appl. No.: 12/118,213

(22) Filed: May 9, 2008

Related U.S. Application Data

(60) Provisional application No. 60/917,059, filed on May 9, 2007.

(51) Int. Cl.
  *G05F 1/613* (2006.01)
  *G05F 1/00* (2006.01)
(52) U.S. Cl. .................. 323/224; 323/283; 323/284
(58) Field of Classification Search .......... 323/224, 323/283, 284
  See application file for complete search history.

(56) References Cited

U.S. PATENT DOCUMENTS

| | | | |
|---|---|---|---|
| 4,468,924 A | | 9/1984 | Moore |
| 5,506,493 A | * | 4/1996 | Stengel ................. 323/223 |
| 5,822,204 A | | 10/1998 | Yamada |
| 6,724,175 B1 | * | 4/2004 | Matsuda et al. .......... 323/283 |
| 7,050,863 B2 | | 5/2006 | Mehta et al. |
| 7,376,472 B2 | | 5/2008 | Wojsznis et al. |
| 7,555,092 B2 | | 6/2009 | Russell, II et al. |
| 2008/0222493 A1 | | 9/2008 | Fediakine et al. |
| 2009/0222136 A1 | | 9/2009 | Lou |

* cited by examiner

*Primary Examiner*—Shawn Riley
(74) *Attorney, Agent, or Firm*—Meyertons Hood Kivlin Kowert & Goetzel, P.C.; Jeffrey C. Hood

(57) ABSTRACT

A method for optimizing operation of a feedback system may include generating a control signal according to a control parameter, regulating an output of the feedback system via the control signal, and monitoring the control parameter. In response to the monitoring indicating that the present value of the control parameter is outside a specific range of values, a first parameter that impacts an operating characteristic of the feedback system may be adjusted until the present value of the control parameter is within the specific range of values. The specific range of values of the control parameter may correspond to a target level of the operating characteristic of the feedback system with respect to the first parameter. One or more additional independent parameters also impacting the operating characteristic of the system may be similarly adjusted to obtain a minimum present value of the control parameter at which the output of the feedback system would be regulated, with the minimum value of the control parameter corresponding to the target level of the operating characteristic of the feedback system with respect to, collectively, the first parameter and the one or more additional independent parameters.

26 Claims, 8 Drawing Sheets

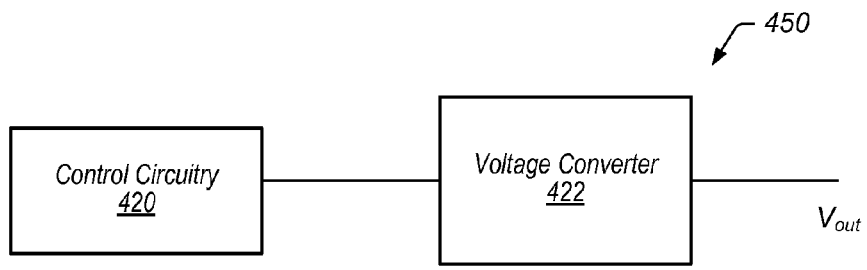
FIG. 4B
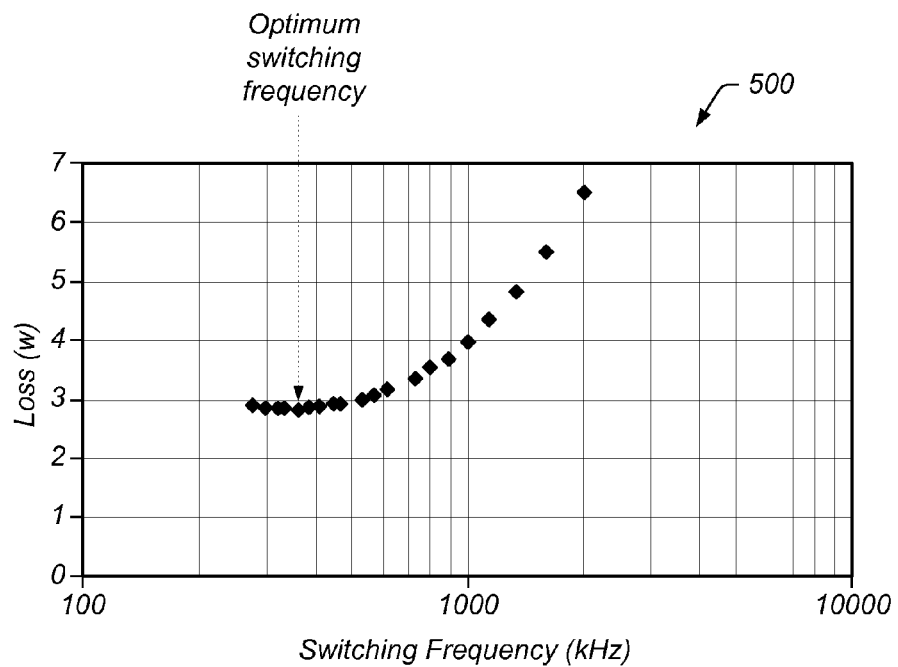
FIG. 5
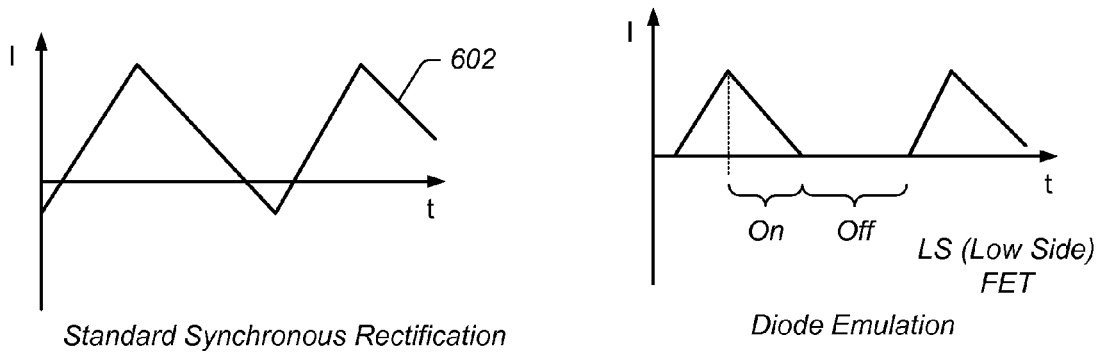
FIG. 6
FIG. 7

CONTROL SYSTEM OPTIMIZATION VIA INDEPENDENT PARAMETER ADJUSTMENT

PRIORITY CLAIM

This application claims benefit of priority of U.S. provisional application Ser. No. 60/917,059 titled "High Performance Power Conversion and Digital Power Control", filed May 9, 2007, which is hereby incorporated by reference in its entirety as though fully and completely set forth herein.

BACKGROUND OF THE INVENTION

1. Field of the Invention

This invention relates to feedback systems and, more particularly, to optimizing the operation of the feedback system with respect to one or more operating characteristics, by adjusting an independent parameter that impacts at least one of the one or more characteristics of the feedback system.

2. Description of the Related Art

The rapid evolution and increased power consumption of commercial integrated circuits, such as microprocessors and graphics processors, has created new and significant problems in delivery of the power to and removal of waste heat from these ICs. Power supply design is now a much more critical and difficult task than it was a few years ago. High-current/low-voltage ICs require a very clean and stable source of DC power. The power source must be capable of delivering very fast current transients. The electronic path to these loads must also have low resistance and inductance (a 1.5V supply would be completely dropped across a 25 mΩ resistance at 60 Amps).

Traditionally, DC power supplies were designed to convert AC line voltage to one or more DC outputs that would be routed throughout a system to the points of load (POL). However, it may not be practical to route high-current signals throughout a system. To overcome this difficulty, and to reduce the ill effects of distributing high current signals around a system, an alternative method of distributing power at modest voltage and current levels has been adopted. Rather than converting an AC supply voltage level to the DC voltage level required by various loads at a central location, the AC supply voltage is typically converted to a "reasonable" DC voltage and routed to the "point of load" (POL), where it is converted locally to the required low voltage. This technique is referred to as "Distributed Power Architecture", or DPA.

In many power distribution systems it is typically not enough to just distribute power around a system to the various POLs. Complex electronic systems are generally monitored and controlled to ensure maximum reliability and performance. Functions (power supply features) typically implemented in DPA systems include supply sequencing, hot swap ability, ramp control, voltage programming, load monitoring, tracking, temperature monitoring, fan speed control, phase control, current sharing, switching frequency programmability, and switching clock synchronization, to name a few. There are other functions that may be required for power systems. For example, single points of temperature measurement, open/closed status of doors and vibration may be of interest.

In order to accommodate a demand for more power and denser systems and the resulting new distribution problems, many present power distribution schemes began offering multiples of each solution, or functions, in a single package. Typically each of these functions requires a separate configuration within the system. That is, each function may require its own interconnection network tying the POL converters together. The interconnection network may implement glue-logic that may be required for control of the POL converters in order for the particular function to be successfully executed during system operation. Many of these functions comprise analog signal control requiring corresponding analog signal lines, with POL converters interconnected in point-to-point configurations. Routing of such signals is often difficult, while no true communication is established between various POL converters and/or between the POL converters and any other elements of the system. In an effort to tie all or most of these functions together at the system level, one approach has been to implement the functions in control ICs responsible for controlling respective POL converters. Some of the functionality may also be programmed into a microcontroller that may communicate with attached POL converters over an I2C (inter-IC communication) bus to coordinate control of all POL converters in the system.

DC-to-DC conversion is often performed by switching power regulators, or step-down regulators, converting a higher voltage (e.g. 12V) to a lower value as required by one or more load devices. A common architecture features distribution of the higher voltage to multiple power regulators, each producing a different (or possibly the same) voltage to one or more loads. Switching power regulators often use two or more power transistors to convert energy at one voltage to another voltage. One common example of such a power regulator 100, commonly called a "Buck Regulator" is shown in FIG. 1. Buck Regulator 100 typically switches a pair of power transistors (108 and 110) in order to produce a square-wave at their common node SW. The produced square-wave can be smoothed out using an LC circuit comprising inductor 112 and capacitor 114 to produce the desired voltage, $V_{out}$. A control loop, comprised of an Error Amplifier 116, a Proportional-Integral-Differential (PID) Filter 102, a Pulse-Width-Modulator (PWM) 104, and an Output Control circuit 106, can be configured to control the duty-cycle of the output square-wave, and hence the resulting value of $V_{out}$.

However, in a feedback control system such as the control loop configured in the Buck Regulator shown in FIG. 1, (or in POL controllers in general) the actual duty cycle value—for the output square-wave of Output Control circuit 106—required to maintain regulation of $V_{out}$ may deviate from a nominal (ideal) duty cycle value that would be required to maintain regulation of $V_{out}$ in an ideal, lossless system. In other words, as a result of the feedback system experiencing energy loss(es), manifested for example as excess heat, the actual duty cycle value required to maintain regulation of $V_{out}$ will deviate from an ideal duty cycle value (required to maintain regulation of $V_{out}$), in proportion to the incurred loss(es). In general, various parameters (that may not directly affect regulation of a system output like $V_{out}$) may lead to conduction losses in the system. It may therefore be desirable to adjust one or more of these parameters in a manner that optimizes system efficiency, without adversely affecting the regulation of the system output.

Many other problems and disadvantages of the prior art will become apparent to one skilled in the art after comparing such prior art with the present invention as described herein.

SUMMARY OF THE INVENTION

In one set of embodiments, a control system may be regulated while optimizing power efficiency of the control system, by adjusting at least one independent parameter that may impact the efficiency of the system, without adversely affecting regulation of the output of the system. In one embodiment, a control parameter is adjusted based on the output of the system, and a first parameter that impacts an operating characteristic of the system is adjusted in response to the adjustment of the control parameter yielding a value of the control parameter that is outside a specific range of values of the control parameter. The specific range of values of the control parameter may correspond to a target level of the operating characteristic of the system with respect to the first parameter. The output of the system may repeatedly be adjusted based on the control parameter. In one set of embodiments, the system implemented may be a voltage regulator, with the operating characteristic specified as the power efficiency of the voltage regulator.

The value of the control parameter may be continually monitored to make the results of the adjustments to the first control parameter available for adjusting the first parameter. Furthermore, the specific range of values of the control parameter may converge to a minimum value, and the first parameter may be adjusted in response to the value of the control parameter deviating from the minimum value. In one set of embodiments, one or more additional parameters that impact the operating characteristic of the system may also be adjusted until the adjusted value of the control parameter falls inside a sub-range of values of the control parameter within the specific range of values of the control parameter. This sub-range of values of the control parameter may correspond to a target level of the operating characteristic with respect to the first parameter and the additional parameters. The output of the system may be controlled using the control signal, which may have a characteristic determined by the control parameter.

In another set of embodiments, operation of a feedback system may be optimized by generating a control signal according to a control parameter, regulating an output of the feedback system via the control signal, monitoring the control parameter, and adjusting a present value of a first parameter that impacts an operating characteristic of the feedback system, in response to the monitoring indicating that a present value of the control parameter is outside a specific range of values of the control parameter, with the specific range of values of the control parameter corresponding to a target level of the operating characteristic of the feedback system with respect to the first parameter. The control parameter may be adjusted based on the output of the feedback system to provide regulation of the output of the feedback system. The feedback system may be a pulse-modulated control system of a voltage regulator, with the output of the feedback system corresponding to the voltage output of the voltage regulator, the control signal corresponding to a pulse-modulated periodic signal, the control parameter corresponding to the duty-cycle of the pulse-modulated periodic signal, and the first parameter may be designated as one of many possible parameters corresponding to a voltage regulator, for example deadtime, gate duration, gate voltage, switching frequency, operating temperature, input voltage, the output voltage of the voltage regulator, output current of the voltage regulator, or gate drive current.

In one set of embodiments, a feedback system may include an output stage configured to generate an output of the system, and a control stage configured to adjust a control parameter based on the output of the system, adjust a first parameter that impacts an operating characteristic of the system, in response to the adjusted control parameter having a value outside a specific range of values, until the adjusted control parameter has a value within the specific range of values. The control stage may be further configured to generate a control signal based on the control parameter and control/regulate the output of the system via the control signal. The specific range of values of the control parameter may correspond to a target level of the operating characteristic of the system with respect to the first parameter.

The control stage may include a comparator stage configured to generate a difference signal based on the output of the system and a reference value, and a parameter control stage configured to adjust the control parameter based on the difference signal. The control stage may also include an adjustment stage coupled between the parameter control stage and the output stage, to adjust the first parameter based on the adjusted control parameter. The feedback system may be implemented as a voltage regulator (POL regulator), with the output stage corresponding to an output stage of the voltage regulator, the output of the system corresponding to the (regulated) output voltage of the voltage regulator, the control signal corresponding to a pulse-width-modulated (PWM) signal, the control parameter corresponding to the duty-cycle of the PWM signal, and the operating characteristic corresponding to the power efficiency of the system. The first parameter may correspond to one of the parameters listed above. In one set of embodiments, a control parameter might initially be adjusted in an attempt to optimize power efficiency, without prior knowledge of the system, and not necessarily in response to the system, but prior to self-correcting the adjustment, or accepting the adjustment based on the system.

BRIEF DESCRIPTION OF THE DRAWINGS

The foregoing, as well as other objects, features, and advantages of this invention may be more completely understood by reference to the following detailed description when read together with the accompanying drawings in which:

FIG. 4B shows a simplified diagram of one embodiment of a POL regulator that includes a voltage converter, and control circuitry for performing regulating and control functions of the voltage converter;

FIG. 5 shows a graph illustrating the relationship between switching frequency and power loss in a PWM feedback control system, according to one embodiment;

FIG. 6 shows a graph illustrating the value of the inductor current of a power regulator during standard synchronous rectification, according to one embodiment;

FIG. 7 shows a graph illustrating the value of the inductor current of a power regulator when rectification is performed using diode emulation, according to one embodiment;

Figure 1:
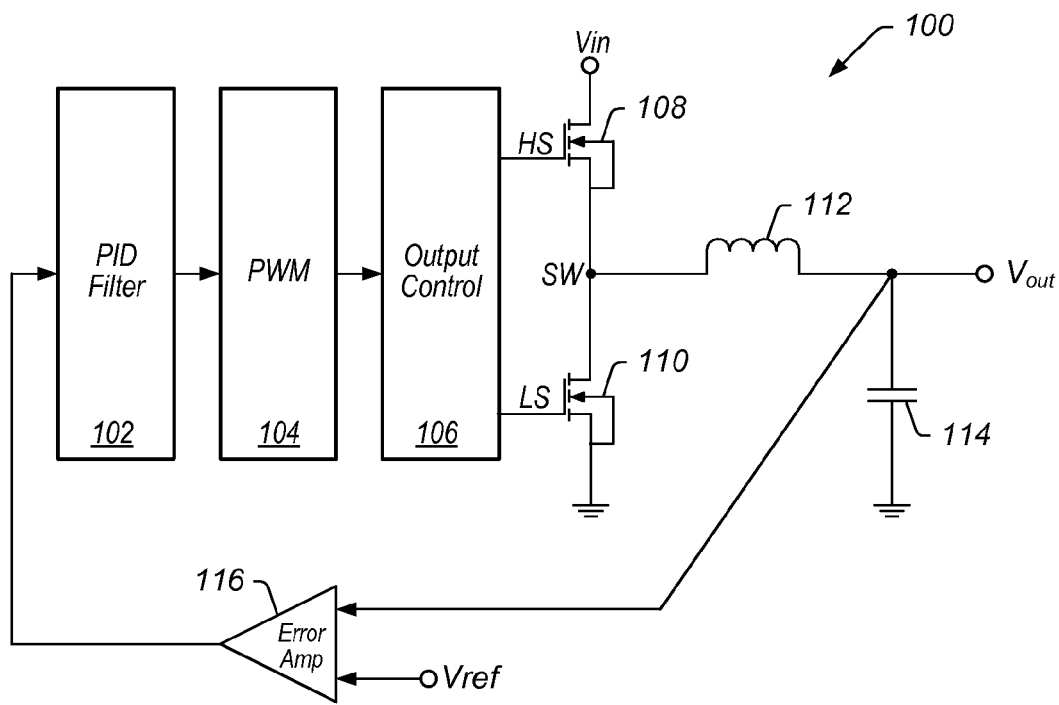
FIG. 1 shows one embodiment of a power regulator (Buck Regulator), according to prior art.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. Note, the headings are for organizational purposes only and are not meant to be used to limit or interpret the description or claims. Furthermore, note that the word "may" is used throughout this application in a permissive sense (i.e., having the potential to, being able to), not a mandatory sense (i.e., must)."

DETAILED DESCRIPTION OF THE PREFERRED EMBODIMENTS

Incorporation by Reference

U.S. Publication No. 20040201279 titled "Method and apparatus for improved DC power delivery management and configuration" and filed on Apr. 8, 2004, whose inventor is James W. Templeton, is hereby incorporated by reference in its entirety as though fully and completely set forth herein.

U.S. patent application Ser. No. 11/198,698 titled "Method For Using A Multi-Master Multi-Slave Bus For Power Management" and filed on Aug. 5, 2005, whose inventors are Kenneth W. Fernald, James W. Templeton and John A. Wishneusky, is hereby incorporated by reference in its entirety as though fully and completely set forth herein.

U.S. patent application Ser. No. 12/118,358 titled "High Performance Power Conversion and Digital Power Control" and filed on May 9, 2008, whose inventor is Chris M. Young, is hereby incorporated by reference in its entirety as though fully and completely set forth herein.

As previously mentioned, one example of a feedback system may be directed to DC-to-DC conversion, which may be performed by a switching power regulator using two or more power transistors, which may operate to convert energy at one voltage to another voltage. In general, as used herein, the terms "voltage regulator" and "point-of-load (POL) regulator" are used interchangeably to refer to a device configured to perform voltage conversion, and which may include not only feedback control circuitry, but also additional control circuitry configured to perform one or more functions related to power regulation and control, in addition to performing voltage conversion. A POL regulator may also be divided into the voltage converter section, which essentially comprises an output stage of the POL regulator, and control circuitry, which may comprise all other functionality of the POL regulator, including the regulating and control functions. In one set of embodiments, the control circuitry may be implemented on an integrated circuit, and coupled to an external output stage to construct a complete POL regulator. One power regulator, a Buck Regulator, was shown in FIG. 1. In general, transistors 108 and 110 may be controlled such that they do not conduct current at the same time. Typically, when transistor 108 is turned on (HS is asserted), transistor 110 may be turned off (LS is de-asserted). However, depending on the details of the power stage and its load, the efficiency of the regulator may be improved by careful control of the relationship between the two gate control signals, HS and LS.

Figure 2:
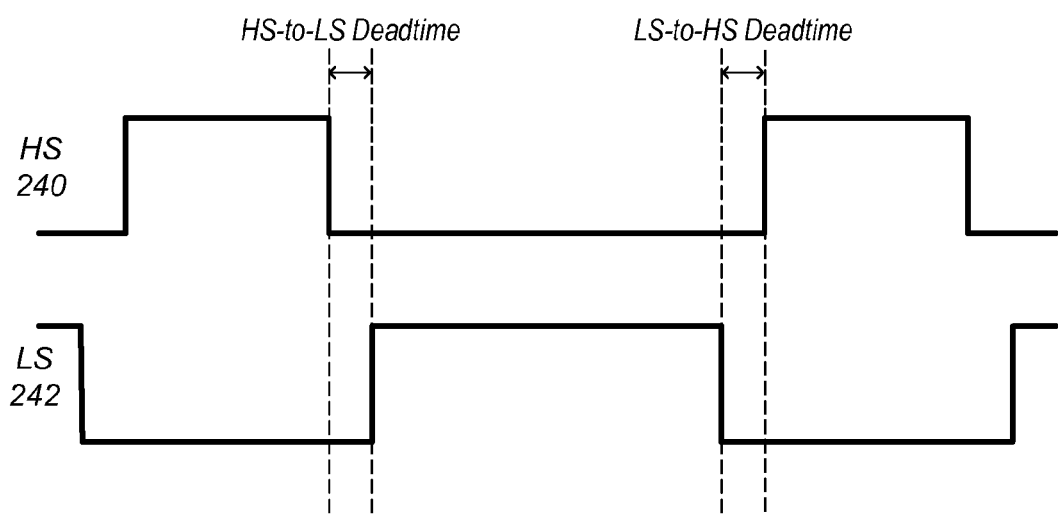
FIG. 2 shows one possible timing diagram for the high side FET and low side FET pulse width modulated (PWM) control signals for the Buck Regulator of FIG. 1 according to prior art.

FIG. 2 illustrates a simple timing diagram for a Buck Regulator, such as the regulator shown in FIG. 1. As shown in FIG. 2, a brief "deadtime" may be generated between transistor 408 being disabled—shown as HS signal 240 de-asserting from a high value to a low value—and transistor 110 being enabled—shown as LS signal 242 asserting from a low value to a high value. The period during which both devices are turned off generally eliminates the possibility of their conducting current directly from the input to ground. If the deadtime is too short, such cross-conduction could waste power. If the deadtime is too long, the body-diode of transistor 110 may conduct current, thereby also wasting power. It is therefore desirable to optimize the timing to obtain greater efficiency, that is, the highest possible ratio of the output power to the input power ($P_{out}/P_{in}$). In general, power efficiency may be thought of as $P_{out}/P_{in}$, and higher efficiency may be regarded as a higher value of the $P_{out}/P_{in}$ ratio. While regulation of the output voltage $V_{out}$ in Regulator 100 takes places primarily by adjusting the duty-cycle of the square waves (shown in FIG. 2, for example) based on $V_{out}$ according to the feedback loop, a waste, or power loss (inefficiency of the system) will also have an effect on the value of the duty-cycle.

Consequently, because the deadtime between signals HS 240 and LS 242 impacts power efficiency, the deadtime will have an indirect effect on the value of the duty-cycle. In one sense, deadtime may be considered an independent parameter that may lead to power loss (as explained above). In this context, deadtime may be considered an independent parameter since it is not a parameter that is configured to directly regulate the value of the output voltage $V_{out}$. In one set of embodiments, it can be demonstrated that power loss (waste of power; inefficiency) actually leads to an increase in the value of the duty-cycle at which regulation of $V_{out}$ may be maintained. As a result of the above-mentioned relationship between deadtime and the duty-cycle value, an optimal value of the deadtime may be determined by monitoring the duty-cycle and adjusting the deadtime until the duty-cycle reaches a minimum value at which regulation of $V_{out}$ can be maintained. The deadtime value thus obtained may correspond to an optimum deadtime value at which the system operates with maximum efficiency. In other words, the deadtime value thus obtained represents minimized loss with respect to the deadtime parameter, and thus represents maximized efficiency with respect to the deadtime parameter.

In general, in certain control systems, the actual value of a control parameter corresponding to a main control signal configured to maintain regulation of the output of the system may deviate from what the value of the control parameter would be in an ideal, lossless system. More broadly, the control parameter may deviate from what the value of the control parameter would be if an operating characteristic of the feedback system did not deviate from an expected, nominal target value or level. Accordingly, a relationship between various operating characteristics of the system and the control parameter, and between the operating characteristics and one or more independent parameters may be established. Again, an independent parameter may comprise a parameter that had not been designated to directly regulate an output of the system. For example, in pulse modulated control systems, the actual value of the duty-cycle required to maintain regulation of the output of the system would deviate from what the value of the duty-cycle would be in an ideal, lossless system. Typically, the actual value of the control parameter may deviate from the ideal value in proportion to the change in operating characteristic of the system, in this case in proportion to the losses. As previously mentioned, in a power (POL) regulator (e.g. a voltage regulator such as Regulator 100) the operating characteristic may be loss, more specifically power loss according to $P_{out}/P_{in}$. Overall, in electrical systems, loss may represent charge loss (leading to heat), while in other systems loss might represent fluid loss, force loss, motion or mobility loss, etc.

Figure 3:
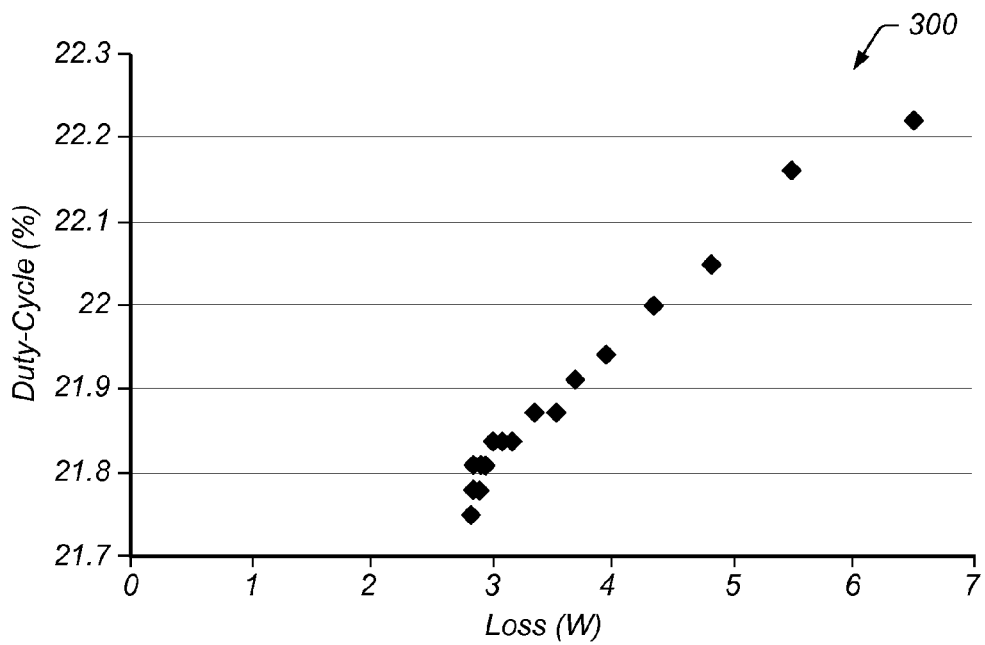
FIG. 3 shows a graph illustrating the relationship between duty-cycle value and power loss in a PWM feedback control system, according to prior art.
Figure 4:
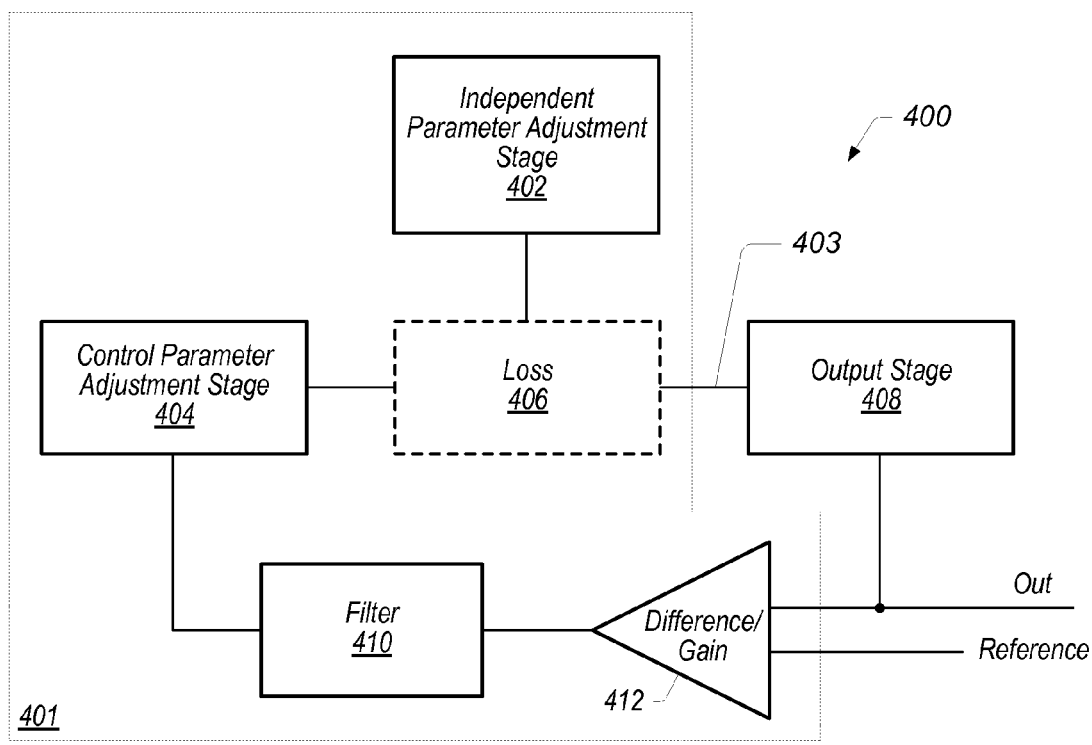
FIG. 4 shows one embodiment of a feedback control system in which an independent parameter may be adjusted to improve efficiency of the system while maintaining regulation of the system output.

FIG. 3 shows a graph 300 illustrative of a relationship of the duty-cycle value and efficiency (power) loss in a system such as Regulator 100. As graph 300 indicates, the duty-cycle value increases with increased power loss in the system. In a voltage regulator, such as Regulator 100, power loss may be effected by a variety of independent parameters, not only by the deadtime value, which was described above. In general, there may be at least one independent parameter that would lead to a loss of efficiency in an electrical system. FIG. 4 shows one embodiment of a system 400 comprising an output stage 408, which may be configured to generate an output (Out), and a control stage 401 configured in a control loop with output stage 408. Control stage 401 may include a control parameter adjustment (CPA) stage 404, which may adjust a control parameter based on the output signal Out and a Reference signal. In one set of embodiments, a Difference/Gain stage 412 may compare Out with the Reference value to generate a difference signal that is filtered through filter 410, and provided to CPA stage 404, which may adjust the control parameter according to the filtered difference signal. The output Out may thereby be regulated according to the feedback (control) loop.

As shown in FIG. 4, an independent parameter may impact an operating characteristic of system 400, for example the efficiency of system 400, which is represented in FIG. 4 by block 406 labeled "Loss". While in the embodiment shown the operating characteristic represents efficiency/power-loss, which may be manifested as charge loss leading to heat, in other systems the operating characteristic may correspond to fluid loss, force loss, motion or mobility loss, for example. As previously discussed, in an electrical system the loss may refer to power loss, as defined by $P_{out}/P_{in}$. In order to optimize for this loss with respect to the independent parameter, the independent parameter may be adjusted at the independent parameter adjustment (IPA) stage 402, the impact on the control parameter may be observed, and the independent parameter may then be adjusted until the control parameter adjusted by CPA 404 reaches a value that corresponds to the targeted level of the operating characteristic, which may mean optimized efficiency with respect to power loss. In general, the independent parameter may be adjusted until the control parameter reaches a value that is within a specific range of values of the control parameter, which may correspond to the targeted efficiency level of the operating characteristic with respect to the independent parameter.

In general, the targeted level of the operating characteristic may be related to various criteria, parameter values, or ranges of parameter values. In some cases, the exact values, for example the actual a range of parameter values, may not be known, but a criterion may well be established prior to system operation. In other words, a clear association may be established between the target level of the operating characteristic and one or more criteria. An example of a criterion may be the duty-cycle reaching a minimum, or the change of the duty-cycle indicating an increase in the duty-cycle. The optimal value or range of adequate values may not be known in advance, but the criterion may be specified. For example, one criterion may be specified as a derivative (e.g. change of duty-cycle) with respect to the independent variable changing sign (e.g. switching from a negative value to a positive value). Accordingly, a specific value or specific range of values of the control parameter are meant to encompass values of the control parameter that satisfy the specified criteria corresponding to the target level or desired target level of the operating characteristic.

FIG. 4B shows a simplified diagram of a POL regulator 450 comprising control circuitry 420, which may be custom circuitry, a controller or processor executing code (e.g. firmware), etc., configured to perform monitoring and select control functionality, and voltage converter 422. In one set of embodiments, control circuitry 420 may be configured on an integrated circuit, and voltage converter 422 may be a voltage regulator such as Regulator 100 shown in FIG. 1. Alternately, voltage regulator 422 may simply comprise a voltage converter (output stage), such as the output stage (comprising HS FET 108, LS FET 110, inductor 112, and capacitor 114) of Regulator 100, while the remaining components of Regulator 100 may be comprised in control circuitry 420, which may also comprise additional circuitry to perform additional functionality of POL 450 regulator.

Considering Regulator 100 (or POL regulator 450) as an example of system 400, the independent parameter may be the deadtime, and the control parameter may be the duty-cycle of the control signal(s) HS 240 and LS 242. Thus, the specific range of values may be designated as a single value, in this case the minimum value of the duty-cycle at which control stage 401 is operable to maintain regulation of output Out ($V_{out}$ in Regulator 100). In some embodiments the specific range of values may be obtained through observation, in other embodiments it may be obtained through calculations. Those skilled in the art will appreciate that the specific value or specific range of values may be determined in a variety of ways other than what has specifically been mentioned.

Thus, IPA 402 may adjust the independent parameter (e.g. deadtime) until the control parameter (e.g. duty-cycle) reaches a minimum value, which may correspond to the least amount of efficiency loss, and may thus maximize efficiency with respect to the independent parameter. In one set of embodiments, there may be more than one adjustable independent parameter, and therefore more than one parameter may be adjusted to optimize efficiency, or to reach the target level of any selected operating characteristic or characteristics. In such cases at least one optimal value of the control parameter may be determined, for example through observation (as mentioned above), and the one or more independent parameters may be adjusted in concert with each other until the optimal value of the control parameter is obtained through CPA 404. Examples of independent parameters that can impact efficiency in power regulators, such as Regulator 100 include deadtime (as previously discussed), gate duration, gate voltage, switching frequency, operating temperature, input voltage, output voltage, output current, and gate drive current. Those skilled in the art will appreciate that other such parameters may also exist depending on specific configurations and system components of a given power regulator.

Adaptive Frequency

Another example of an independent parameter that may affect/impact the efficiency of a power/voltage regulator is the switching frequency. As switching frequency is changed in a pulse modulated power conversion system, the energy losses may increase or decrease. As switching frequency is increased, for example, switching losses increase leading to a decrease in efficiency. On the other hand, as frequency is decreased, the RMS (root mean square) current to average current ratio may increase, leading to high conduction losses, and therefore to lower efficiency. There may be, then, an optimal switching frequency at which the system may operate with an optimal efficiency, for a given set of topological, component, parametric, and environmental conditions. FIG. 5 shows one example graph 500 of the relationship between switching frequency (given in KHz, on the horizontal axis) and power loss (given in Watts, one the vertical axis). In the embodiment shown, the value of the switching frequency at which the system appears to be operating at an optimum efficiency—that is with the least amount of loss—is around 360 kHz.

In one set of embodiments, the switching frequency (e.g. the frequency of signal(s) HS 240 and LS 242 for Regulator 100) may be adjusted, based on the relationship between the duty-cycle, switching frequency, and efficiency, according to the principles described above. Accordingly, as the switching frequency is adjusted, the resulting value of the duty-cycle may be compared to the previous value of the duty-cycle. If the resulting value of the duty-cycle is less than the previous value of the duty-cycle, then the switching frequency may be changed until the value of the duty-cycle begins to increase. It should be noted, that the duty-cycle may vary from adjustments made to the duty-cycle based on the feedback loop (e.g. by CPA 404 as shown in FIG. 4), the duty-cycle being the primary control parameter configured in the feedback loop to maintain regulation of the output $V_{out}$. The switching frequency may then be maintained such that the duty-cycle is minimized. This may be performed in either a continuous or discontinuous mode of operation of the power/voltage regulator. Continuous mode of operation may be designated as a time when current is continuously flowing in the inductor, e.g. in inductor 112 of Regulator 100, while discontinuous mode may refer to a time when the inductor is not conducting any current.

Overall, optimal operation, or improved operation (with respect to efficiency) of the system may be maintained by adjusting the switching frequency according to one of various different algorithms. While some of the algorithms, such as previously described, may result in optimum system efficiency, other algorithms may not automatically optimize efficiency, but may operate to improve the efficiency. For example, according to one alternative algorithm, the switching frequency may be adjusted below a programmed value, which may be considered a nominal default value, when the duty-cycle of the HS 240 signal reaches a designated value, for example when it is below half of its maximum value. When the duty-cycle of the HS 240 signal is at zero, the switching frequency may saturate (i.e. it may be adjusted to reach and remain) at a fixed minimum value. When the duty-cycle of the HS 240 signal is above half of its maximum value, the switching frequency may saturate at the programmed value. These boundary conditions may therefore define a saturating linear equation for a scaling factor that may be used to scale the programmed value of the switching frequency. The linear equation may define the scaling factor as a function of the duty-cycle of the HS 240 signal, as follows:

$$sf = \frac{\frac{(f_{NOM} - f_{MIN}) * 2 * D}{D_{MAX}} + f_{MIN}}{f_{NOM}}, \quad (1)$$

where 'sf' is the scaling factor, '$f_{NOM}$' is the nominal (programmed) switching frequency, '$f_{MIN}$' is a specified minimum switching frequency, 'D' is the monitored duty-cycle value (which may be adjusted as per CPA stage 404), and '$D_{MAX}$' is the maximum duty-cycle value. It should be noted that while '$D_{MAX}$' is used here to reference a maximum value of the duty-cycle, the equation may be modified to account for the value of the duty-cycle coming within a specific range of '$D_{MAX}$'. In one set of embodiments, if the value of the scaling factor exceeds 1, it may be (re)set to 1.

The minimum switching frequency value may be specified as one of two values. A first value may be specified as 700 KHz, for example, and may be used when the programmed frequency is above or equal to a specific threshold value, e.g. 750 KHz. A second value may be specified as 200 KHz, for example, and may be used when the programmed frequency is below the specific threshold value (e.g. 750 KHz). The switching frequency may be adjusted once per main loop iteration. The switching frequency scaling factor target value may be calculated using the formula (1) shown above, and may be used to adjust the operating switching frequency. In one set of embodiments, for example when a PLL (phase-locked loop) is used, the value of a PLL divider register may be adjusted toward the scaling factor target value by a specified increment, e.g. a unit value, for each iteration of the main loop (such as the feedback loop of Regulator 100 in FIG. 1). When the duty-cycle of the HS 240 signal settles, the target switching frequency may also settle, and the register value may converge to the scaling factor target value. This behavior may operate to prevent any voltage spikes. Frequency adaptation may be automatically disabled during ramp-up and ramp-down times of the voltage regulator. As previously mentioned, while the alternative algorithm described above may not automatically optimize the efficiency of the system with respect to the switching frequency, it may substantially improve the efficiency of the system.

Overall, in a system in which switching frequency of a control signal may be considered an independent parameter (as described above), the efficiency of the system may be improved by implementing an algorithm that automatically adjusts the switching frequency when a control parameter (which may correspond to a control signal) used for maintaining regulation of the system output reaches a specific value, or is within a specific range of values. The switching frequency may be adjusted based on a scaling factor obtained from calculations performed according to a previously specified equation or set of equations, or it may be repeatedly adjusted based on a monitored value of the control parameter.

Diode Emulation

Synchronous rectification is a technique that may be used when performing power conversion, such as pulse modulated power conversion, whereby a controlled switch (e.g. a MOSFET) is configured to operate as a rectifier. One motivation for using a switch as a rectifier is that a MOSFET switch, for example, may incur lower conduction losses than a rectifier, which it has been configured to replace. Referring to the Regulator in FIG. 1, LS FET 110 may be configured to also operate as a rectifier, thereby eliminating the need to couple a rectifier, e.g. a diode, between ground and the lower terminal of LS FET 110. Accordingly, LS FET 100 may be configured to operate to prevent current from flowing through LS FET 110 when HS FET 108 is conducting current. In other words, by configuring LS FET 110 to operate as a rectifier, shoot-through current is prevented while HS FET 108 is conducting current. However, when using a MOSFET switch (such as LS FET 110) as a rectifier in this manner, the switch is actually still capable of conducting current in both, positive and negative, directions when it is turned on. Therefore, a synchronous rectifier may not be considered a true rectifier, as it does not prevent reverse current flow. A synchronous rectifier, then, may operate as a rectifier in that it may conduct current in a forward direction in a manner in which a normal rectifier would be conducting in the forward direction. While under standard operating circumstances this may not be an issue, it may give rise to certain problems when the average current flowing in the inductor (e.g. inductor 112) falls below a certain value.

In the example shown in FIG. 6, during synchronous rectification, when the average current is less than half of the ripple current 602, the current may reverse in the inductor. In FIG. 6, the vertical axis represents the current that may flow out of the voltage regulator (e.g. in inductor 112 of Regulator 100, shown in FIG. 1). Therefore, during a switching cycle, energy may be stored on the output capacitance (e.g. capacitance 114 in FIG. 1) by current flowing into the output capacitance, and when the current reverses, the stored energy may result in current flowing out of the output capacitance. This circulating current may lead to an RMS (root mean square) current much higher than the average current, further leading to conduction losses (i.e. power loss or efficiency loss) greater than would otherwise be present with the same average current. Since a true rectifier doesn't permit reverse current flow, by emulating the operation of a true rectifier (diode), a significant reduction in conduction loss may be achieved.

In one set of embodiments, diode (or rectifier) emulation in a voltage regulator, e.g. Regulator 100 in FIG. 1, may be achieved by turning off LS FET 110 before current can reverse, to significantly reduce conduction losses. As illustrated in FIG. 7, the reverse current that would be conducted by the MOSFET switch (LS FET 110) is eliminated by turning switch off at the appropriate time, thereby emulating a true rectifier (or diode) operation. This may be in addition to having LS FET 110 already configured to prevent conducting any current when HS FET 108 is itself conducting current. There are a number of analog implementations for performing diode emulation, but such implementations typically require a low offset, zero current crossing detector circuit. Due to detection and switching delays, noise, and other associated issues, analog implementations of diode emulation may not always result in optimal operation, and may not provide means for achieving the lowest possible losses in a given system. In many cases the system may operate at optimum efficiency when there is actually some reverse current flow present in the inductor, and completely eliminating reverse current flow in the inductor may therefore be to the detriment of optimum efficiency. In addition, many of the analog implementations may not be cost effective.

In one set of embodiments, a mixed-signal system may be configured to implement digital diode emulation. As previously described, by deriving a relationship between a control parameter (e.g. the duty-cycle of LS signal 242 and HS signal 240) and power loss in the system (e.g. the feedback control of Regulator 100) from a relationship between the control parameter and an independent parameter that affects power loss in the system, efficiency may be optimized by adjusting the independent parameter based on the value of the control parameter. More specifically, the independent parameter may be adjusted based on a monitored (or observed) value of the control parameter, which may be adjusted based on the output of the system (e.g. $V_{out}$ of Regulator 100) as part of the regulation of the output of the system. It should also be noted that in certain embodiments it may also be possible to adjust the independent parameter, depending on the function of the parameter within the system configuration, without having to monitor the control parameter.

Diode Emulation—First Algorithm

Referring again to Regulator 100, diode emulation may be implemented by adjusting the on-time of LS FET 110, and observing the effect of the adjustment on the duty-cycle of HS signal 240. In one embodiment, the on-time of LS FET 110 may be adjusted until the duty-cycle of HS signal 240 corresponds to the lowest energy (power) loss in the system, which, may be represented by a smallest duty-cycle value at which regulation of $V_{out}$ is maintained, as per the feedback loop in Regulator 100. In other words, since the duty-cycle has been shown to be proportional to power loss (as described above), by minimizing the duty-cycle, power loss may be minimized, thereby maximizing the efficiency. Because the diode emulation described above may be implemented through digital techniques, it may not require analog control means, such as expensive and precise zero current detection circuits, for example. In addition, as mentioned above, due to the opportunity for zero voltage switching, the most efficient switching point for turning off LS FET 110 may not be at exactly the zero current crossing (as reverse current flow in the inductor is allowed to occur).

Figure 8:
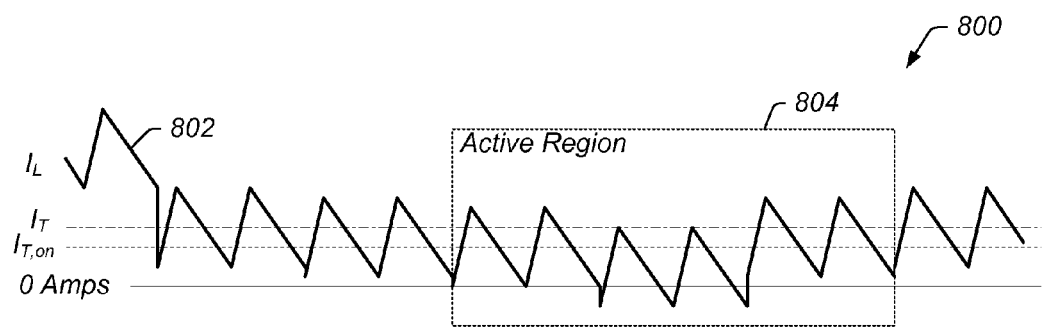
FIG. 8 shows a graph illustrating the value of the inductor current of a power regulator with respect to the active discontinuous region, according to one embodiment.

As shown in diagram 800 of FIG. 8, a current-ripple-threshold ($I_T$) for the inductor current 802 ($I_L$) may be programmed with an average current value corresponding to current 802 averaged up to the time the inductor enters a discontinuous mode of operation, that is, when the inductor stops conducting current for any period of time. The nominal average current value may correspond to one-half the value of the ripple current 802, that is, one-half of the peak-to-peak value of current 802. This average current value may be in contrast to an average current value corresponding to current 802 averaged up to a time the inductor current has been below 0 Amps for a specified part of the switching period. The active (discontinuous) region 804 shown in FIG. 8 may represent an operating region in which the (running) average current value is right at and/or below one-half of the ripple current (as defined above). The programmed level ($I_T$) may intentionally be set higher by a certain percentage, for example by as much as 10% or more.

In FIG. 8, $I_{T,on}$ may therefore represent the actual average current value, and $I_T$ may represent the actual average current value increased by a specified percentage. Hysteresis may also be built into the $I_T$ control, such that from the perspective of the switching device, $I_T$ may be considered to be in the active region if the averaged current (the average current value) had fallen below the threshold value minus a specified percentage (e.g. 10%), and it had not risen above or exceeded $I_T$. Thus, the system may be configured to turn on the diode emulation algorithm when the averaged current falls to and/or below $I_{T,on}$, and discontinue diode emulation when the averaged current rises to and/or above $I_T$. The averaged current at any point in time may be determined through a variety of methods, such as the method disclosed for example in U.S. patent application Ser. No. 11/366,260 titled "Method for Accurate Current Sensing in Power Converters".

The threshold may be implemented for a variety of reasons, such as providing additional time that may be required to set up other parameters and/or enable/disable other specified algorithms. For example, in one set of embodiments, the threshold may provide preparation time during which certain control firmware may enable or disable various adaptive algorithms that may each be directed to improving the efficiency of the system. Such algorithms may include dead-time adjustment, diode emulation, adaptive compensation, and others. Most of the adaptive algorithms may operate to allow a control parameter—such as the duty cycle of HS 240 and/or LS 242, for example—to attain a specific value corresponding to the most efficient operation of the system. As previously mentioned, the adaptive algorithms may be directed to obtaining the lowest duty cycle in detecting the minima, and the threshold may be configured as a system flag used for arbitrating which algorithm has precedence over the regulation loop (e.g. the feedback loop shown for Regulator 100 in FIG. 1). For example, when the average current is below the $I_T$ level (from FIG. 8), the low-to-high dead-time updates (see LS-to-HS Deadtime in FIG. 2, for example) may be frozen at the last value. In the active discontinuous region (804), diode emulation may be engaged to adjust the width of LS 242 to achieve higher efficiency.

In one set of embodiments, the diode emulation algorithm may use the programmable current ripple threshold ($I_T$) to determine whether the inductor is in, or around discontinuous mode. If it is determined that the inductor is in the active discontinuous region, the duty-cycle of HS 240 may be monitored, for example by firmware implementing one or more of the control algorithms, and may be consecutively measured a specified number of times, or over a specified time period, for example over 1024 switch cycles, and may be averaged over that period, e.g. over 1024 switch cycles. The width of the LS 242 pulse may then be adjusted to obtain the duty-cycle of HS 240 that may closely correspond to the cross-over point where the inductor current ($I_L$) goes below 0 Amps.

Figure 9:
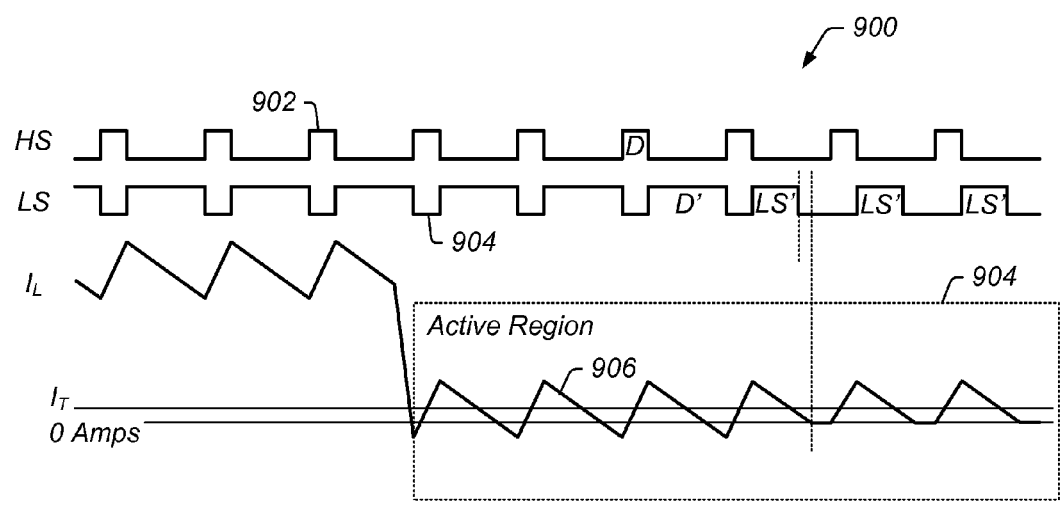
FIG. 9 shows a graph illustrating the value of the inductor current of a power regulator, and pulse width adjustment of the low side FET control signal during diode emulation, according to one embodiment.

One embodiment of this operation is shown in FIG. 9. Waveforms 902 and 904 represent HS 240 and LS 242, respectively, (see also FIG. 2), and $I_L$ 906 is again, the current flowing in inductor 112. As seen in FIG. 9, when the averaged value of $I_L$ indicates that the inductor is operating in active discontinuous region, that is, the averaged value of $I_L$ is around the threshold $I_T$, consecutive measurements of the duty-cycle of HS 902 may lead to the adjustment of the pulse of LS signal 904, to the value LS', which may then be maintained while the inductor is operating in the active discontinuous region. Once the measured averaged value of current $I_L$ falls below the ripple threshold $I_T$, an initial LS' value for the adjusted pulse length of LS signal 904 may be calculated, according to, for example, the following equation:

$$LS' = (I_{threshold} - I_{out,ave.}) * \frac{(V_{in} - V_{out})}{(V_{in} * I_{threshold})} * 2^{Resolution,LS} * 85\%. \quad (2)$$

The resolution of the value of the pulse width of LS signal 904 may depend on the manner in which diode emulation is implemented. For example, in one set of embodiments, power regulation control may be implemented on an integrated circuit (IC), which may comprise a hardware portion configured to control the width of the pulse of LS signal 904, and the value of the pulse width may be bounded by the number of bits dedicated to storing and generating the value of the pulse width. In one embodiment, the pulse width of LS signal 904 may be configured with 6-bits of resolution. The value LS' may intentionally be calculated to a width less than the optimal width by a certain percentage, e.g. by 85%. This may provide the diode emulation algorithm with the capability to intelligently begin its search. The algorithm may search for a minimum HS duty-cycle value using an averaged value of the duty-cycle of HS signal 902. If the input voltage changes, the value LS' may be recalculated.

However, modulating the pulse width of LS signal 904 (LS 242) may require extreme care. Small adjustments of LS 904 (LS 242) may result in charge displacement in inductor 112, which may lead to voltage spikes on the output ($V_{out}$). Therefore, it may be desirable to use small steps in reducing the width of the pulse of LS signal 904 from D' to LS'. Even using smaller steps, output voltage ($V_{out}$) perturbations may not be completely eliminated. However, the smaller the adjustments to the pulse width of LS signal 904, the smaller the perturbations on the output ($V_{out}$). In addition, less frequent adjustments may also provide more time for the main loop (e.g. control loop shown in FIG. 1) to recover. Therefore, changes made to the value of the pulse width of LS signal 904 may be kept small, and the adjustment may be performed slowly. This may increase the time for the adaptive algorithms to work, without compromising the transients in the discontinuous region, since the large transient expected at light loads may be a loading case. [Loading cases may cause NLR to react with a larger pulse width of HS signal 240.]

Figure 10:
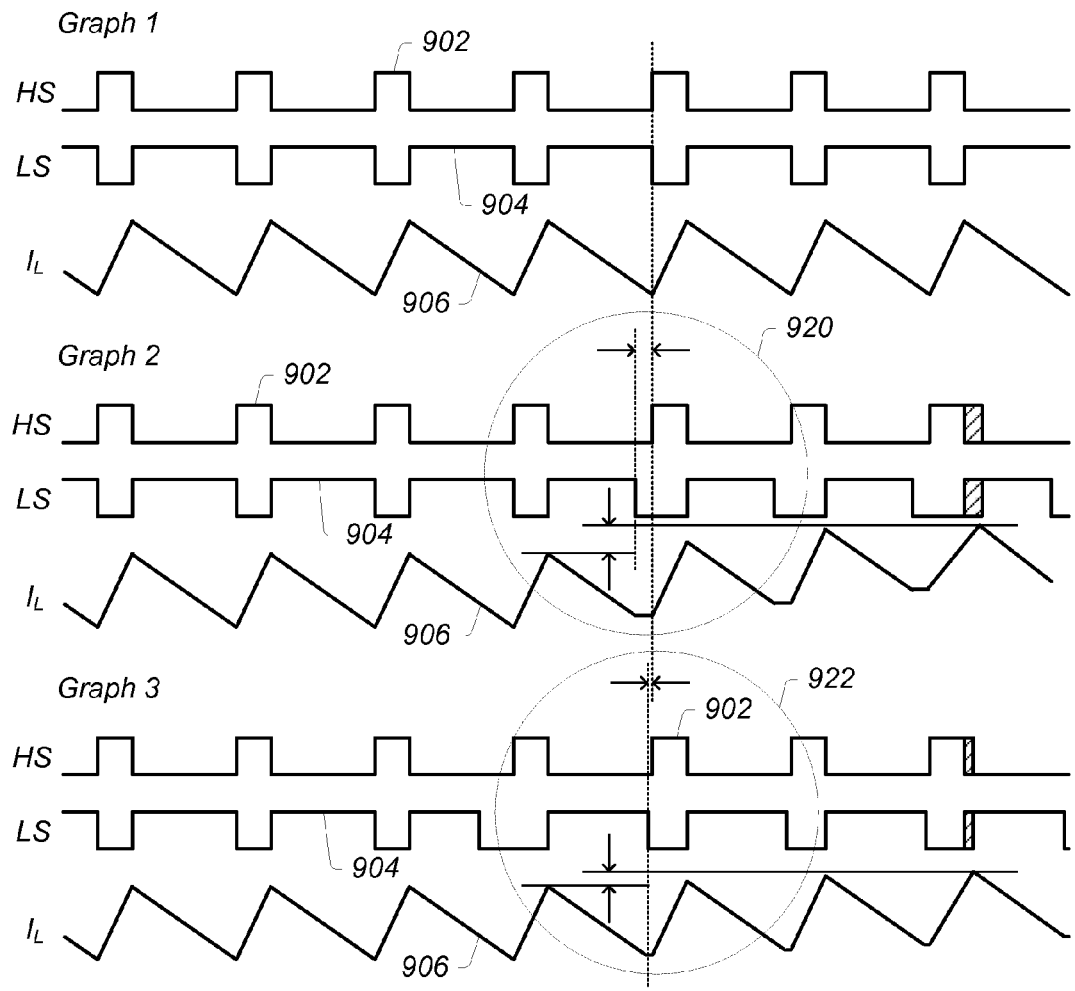
FIG. 10 shows graphs illustrating the value of the inductor current of a power regulator, and pulse width adjustment of the low side FET control signal using small steps and large steps during diode emulation, according to one embodiment.

FIG. 10 shows various graphs to illustrate the behavior of $I_L$ 906 when small step sizes and large step sizes are taken in adjusting the duty-cycle of LS signal 904. As shown in FIG. 10, Graph 1 illustrates HS 902, LS 904, and $I_L$ 906 when the inductor is operating in the active discontinuous region, prior to the adjustment of the pulse width of LS signal 904. Graph 2 illustrates HS 902, LS 904, and $I_L$ 906 when the pulse width of LS signal 904 is adjusted using a relatively large step, highlighted in encircled area 920. Graph 3 illustrates HS 902, LS 904, and $I_L$ 906 when the pulse width of LS signal 904 is adjusted using a relatively small step, highlighted in encircled area 922. As seen in Graphs 2 and 3, a smaller step size in adjusting the pulse width of LS signal 904 may result in a smaller increase in the peak value deviation of $I_L$ from the original peak value in Graph 1.

Diode Emulation—Second Algorithm

As previously mentioned, an independent parameter, in this case the pulse width of LS signal 242 (904), may also be adjusted without making the adjustment dependent on continually monitored control parameter, in this case the duty-cycle of HS signal 240 (902). In a basic algorithm, diode emulation may be implemented by performing an alternative algorithm once it has been determined that the inductor is operating in the active discontinuous region. Accordingly, in one set of embodiments, a first circuit, e.g. an LS modulator, may be configured to continuously adjust the pulse width of LS signal 242 (904) using the following formula:

$$D' = 0.9 * D * ((V_{in} - V_{out})/V_{out}), \quad (3)$$

where D' is the resultant duty-cycle of LS signal 242 (904), D is the measured HS duty-cycle of HS signal 240 (902), $V_{in}$, is the measured input voltage, and $V_{out}$ is the output voltage set point, that is, the nominal output voltage $V_{out}$ of the regulator. A scaling factor, in this case 0.9, may be included to keep the falling edge of the LS pulse away from the rising edge of the HS pulse by a small amount. This may result in allowing the regulator (e.g. Regulator 100) to automatically exit continuous mode and enter discontinuous mode when the load current drops. Because continuous/discontinuous transitions may be automatic, diode emulation may thereby be configured independently of current measurements and their associated inaccuracy, and may be based instead on a calculated current. In other words, the discontinuous operating mode may be recognized through monitoring the duty-cycle of the HS signal 240 (904), thereby not requiring measurement circuits for determining the zero-crossing of inductor current $I_L$. Without the scaling factor, the converter may remain in continuous mode and might not exit on its own, which may necessitate implementing a forced exit for the converter as a function of measured current levels.

In discontinuous mode, the measured HS duty-cycle (D) may naturally begin to shrink from a maximum value due to the regulation of the voltage loop. This inflection point may be detected and a flag may be set to indicate a discontinuous mode of operation. This flag may be used to switch from measured load current averaging to a calculated load current, as a function of averaged HS duty-cycle. In one set of embodiments, the duty-cycle of LS signal 904 may be adjusted once per main loop iteration. The target LS duty-cycle may be calculated using the formula shown above, and the LS control register, which may be a register configured to hold the present value of the duty-cycle of LS signal 242 (904) may be adjusted toward the target value by a specified amount, e.g. by a unit increment, for each main loop iteration. Once the duty-cycle of HS signal 240 (902) has settled, the target duty-cycle of LS signal 242 (904) may also settle, and the register value may converge to the target value. This behavior may operate to prevent any voltage spikes. In one embodiment, diode emulation may be automatically disabled during ramp up and ramp down times.

Diode Emulation—Advanced Algorithm

Figure 11:
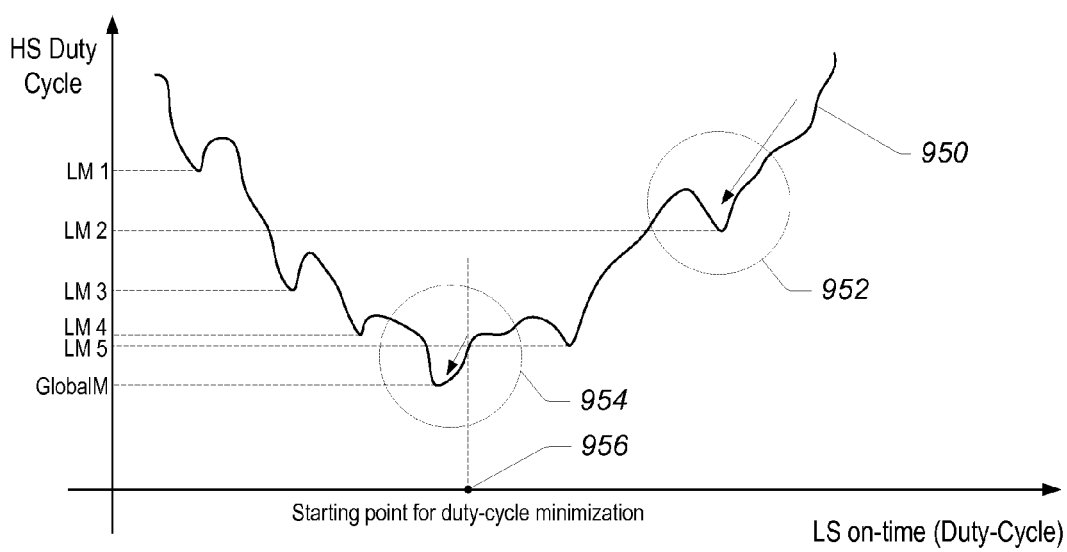
FIG. 11 shows a graph illustrating the relationship between the duty-cycle of the HS control signal and the duty-cycle of the LS control signal, according to one embodiment.

As shown above, two separate algorithms, algorithm 1 and algorithm 2, may be configured to perform digital diode emulation. Algorithm 2 may operate to recognize when the inductor enters discontinuous mode without requiring measurement circuits for determining the zero-crossing of inductor current $I_L$. However, since the target duty-cycle of LS signal 242 (904) is based on a calculated load current, it may not result in an optimal adjustment of the pulse width (and consequently, duty-cycle) of LS signal 242 (904) with regards to the efficiency of the voltage regulator. On the other hand, algorithm 1 may operate to settle on a local minimum value of the duty-cycle of HS signal 240 (902), as opposed to a global minimum value which may correspond to optimum system efficiency (as previously described). This is illustrated in FIG. 11, which shows a possible relationship between the HS duty-cycle and LS duty-cycle, in which local minima LM1-LM5 may exist on a function curve 950 relating HS duty-cycle to LS duty-cycle, in addition to a global minimum GlobalM, which may correspond to the smallest value of the HS duty-cycle with respect to the value of the LS duty-cycle (at point 956) at which regulation of the system output may be maintained.

As shown in encircled area 952, algorithm 1 may operate to find/obtain local minimum LM2, for example, but not global (overall) minimum GlobalM. As shown in encircled area 954, algorithm 2 may properly determine a starting point for duty-cycle minimization, but not the LS duty-cycle value at which the minimum HS duty-cycle value may be obtained. Thus, algorithm 1 and algorithm 2 may be combined to ensure that algorithm 1 does not lock on local minima LM1-LM5. In other words, referring back to FIG. 8, when the averaged current falls to and/or below threshold $I_{T,on}$, algorithm 1 may be engaged to determine a starting LS duty-cycle value based on the calculation from equation (3), and algorithm 2 may subsequently be engaged for minimizing the HS duty-cycle by adjusting the LS duty-cycle value until the global minimum value GlobalM for the HS duty-cycle is reached. It should be noted, again, that while FIG. 11 shows a relationship between the LS duty-cycle and HS duty-cycle in terms of obtaining a global minimum value of the HS duty-cycle, any value of the HS duty-cycle may be targeted based on a desired target level of the system characteristic which may be affected by the LS duty-cycle value. Thus, both algorithm 1 and algorithm 2 may be modified according to the relationship between the control parameter (in this case the HS duty-cycle), and the independent parameter (in this case the LS on-time, or duty-cycle).

Finally, it should be noted that one or more power control systems may be configured with POL regulators operating according to the principles described above, with the POL regulators communicating with each other over a common bus, which may be a serial bus, as set forth, for example, in U.S. Publication No. 20040201279 and U.S. patent application Ser. No. 11/198,698, which were previously indicated as being incorporated by reference as though fully and completely set forth herein.

Figure 12:
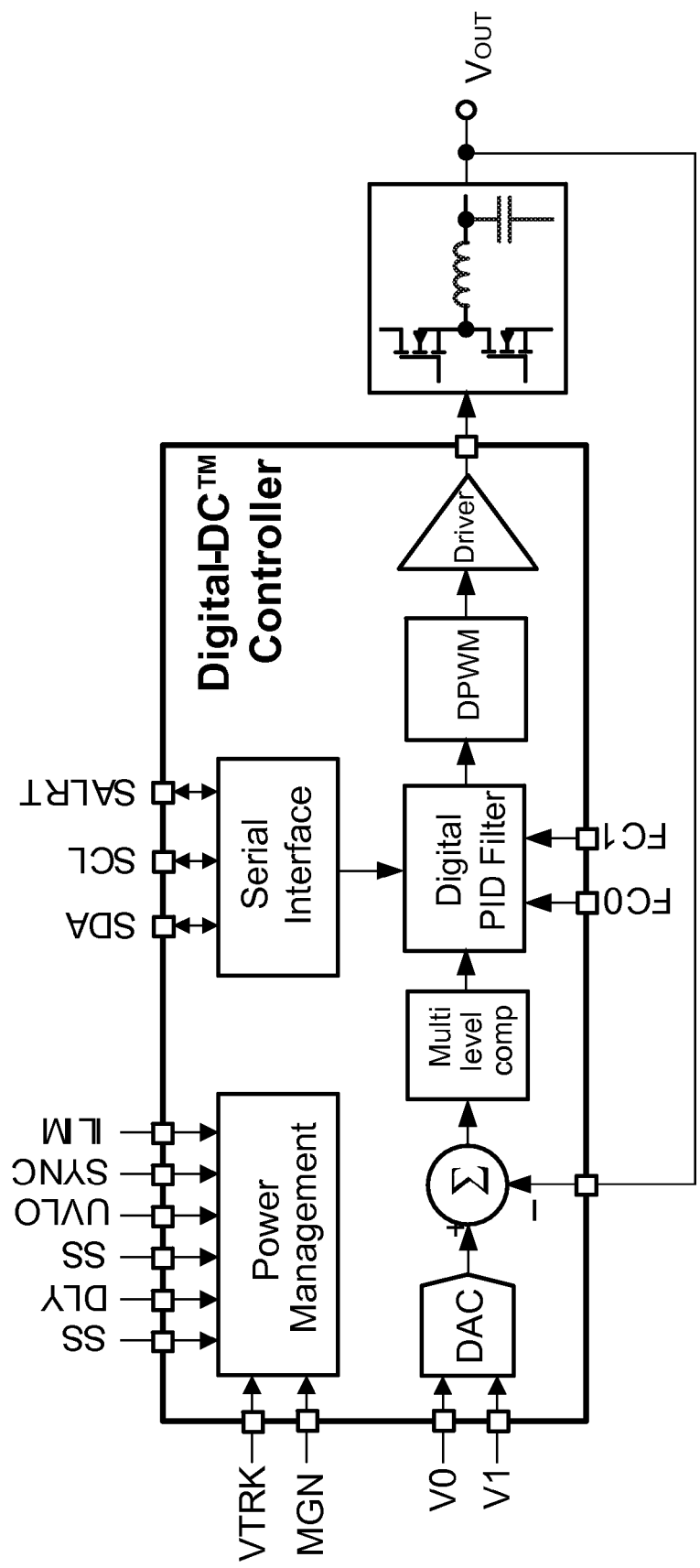
FIG. 12 shows one embodiment of a POL regulator comprising a control unit configured to perform regulation and power management functions.

For example, in one embodiment, as shown in FIG. 12, a point-of-load (POL) regulator 2000 may include a Controller 2202 and an output stage 2220 coupled together. Controller 2202 may be an integrated circuit, and output stage 2220 may comprise output switches, an inductor and a capacitor, to generate an output voltage of POL regulator 2000. Controller 2202 may include a power management unit 2204, a serial interface 2206, a digital-to-analog converter 2208, a pulse-width-modulated (PWM) control signal generating module 2216, driver circuitry 2218, and a digital filter, which may be a digital PID filter 2214. Controller 2202 may be configured to perform various power control functions and regulate the voltage output $V_{out}$ of the POL regulator through a feedback loop to summing element 2201, the feedback loop including digital filter 2214, PWM generator 2216, and driver circuit 2218. In one set of embodiments, Digital PID filter 2214 may be configured with the proper coefficients through serial interface 2206 and/or via pins FC0 and FC1.

Figure 13:
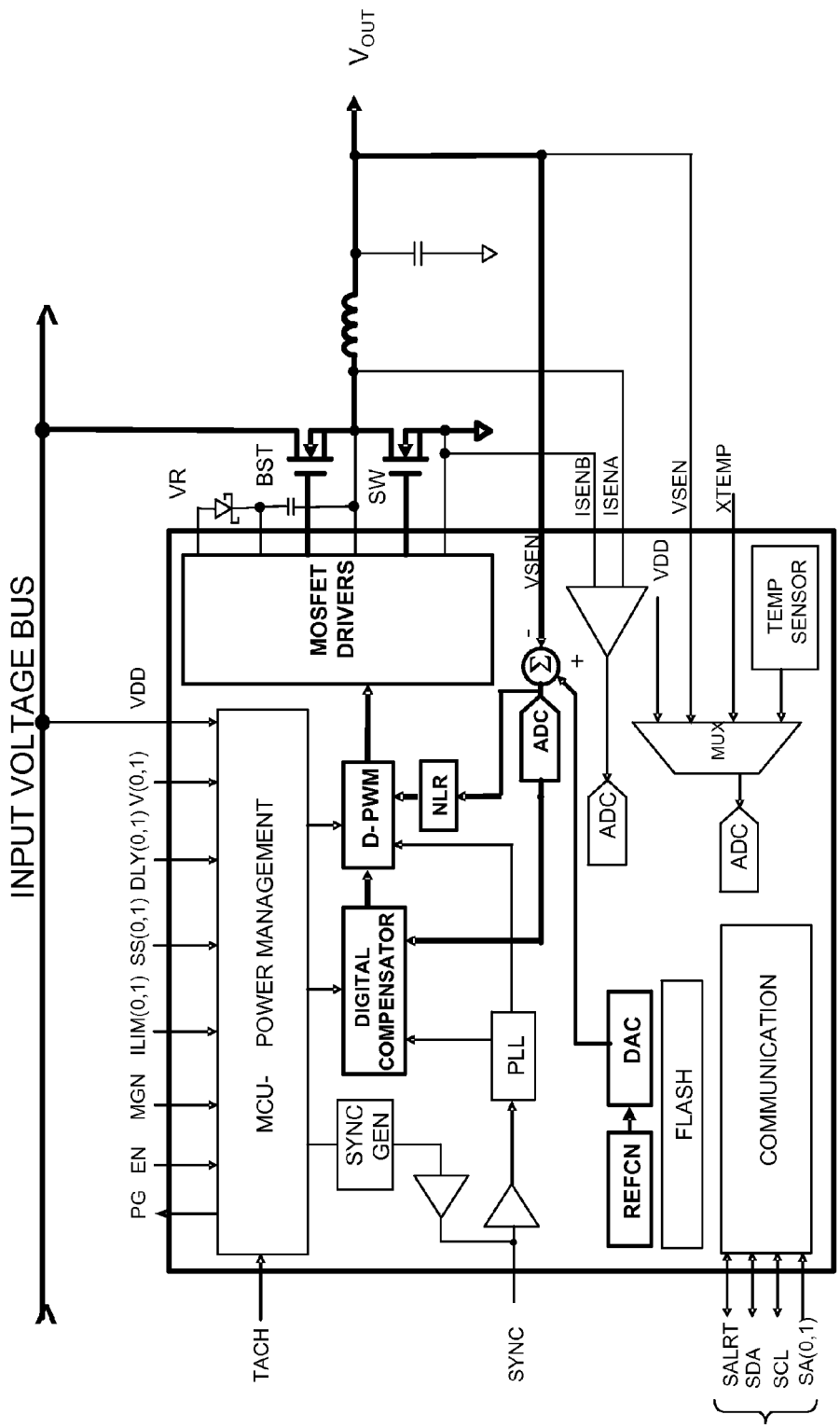
FIG. 13 shows a more detailed embodiment of the control unit shown in FIG. 12.

FIG. 13 shows a more detailed embodiment of the POL regulator 2000 from FIG. 12. As shown in FIG. 13, a Digital-DC-Controller chip may include a microcontroller 2304 configured to execute various algorithms directed at performing various power management functions, a digital compensator 2310, a PWM signal generator 2316, a sync signal generator 2306, a PLL 2314, an ADC 2322, a temperature sensor 2340, a communication interface 2330, a memory storage element 2328, which may be a flash memory, a register 2324, and MOSFET drivers 2320 for driving the high-side FET and low-side FET configured to generate the output $V_{out}$ of the POL regulator from an input voltage received through input voltage bus 2302. As indicated in the embodiment of the POL regulator shown in FIG. 13, a feedback control loop for controlling the output voltage $V_{out}$ and compensating the plant element of the POL regulator may be established via ADC 2322, which may convert $V_{out}$ into a digital value provided to digital compensator 2310, which may effect control of PWM generator 2316, which may itself control MOSFET drivers 2320. MCU 2304 may be configured to execute firmware directed at performing a variety of power management functions. For example, MCU 2304 may be configured to execute a variety of algorithms including adaptive frequency adjustment and/or diode emulation algorithms for optimizing the power efficiency of the POL regulator, load current monitoring, duty-cycle monitoring, etc.

Figure 14:
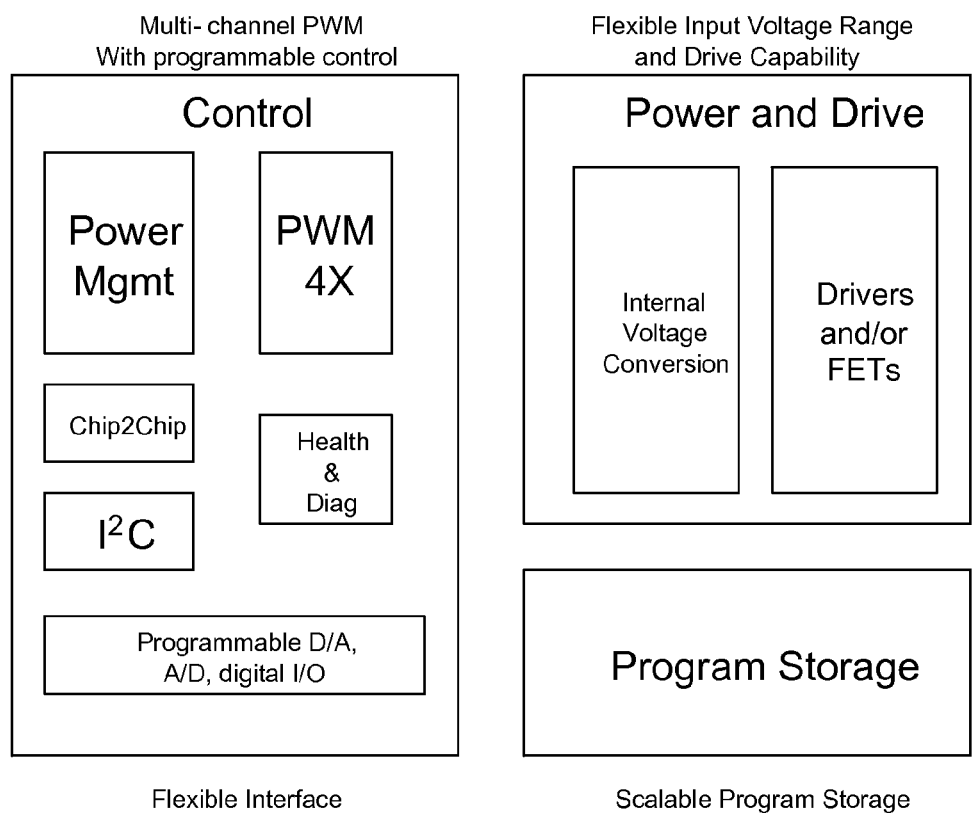
FIG. 14 shows a higher level block structure of one embodiment of a POL regulator divided into a programmable control unit, a power and drive unit, and a program storage unit.

FIG. 14 shows a higher level block structure of one embodiment of a POL regulator, which may be divided according to control and power/driver functionality. In one embodiment, a POL regulator may be partitioned into a control unit 2402 comprising power management functionality 2404, PWM control signal generation 2406, chip-to-chip 2408 and I²C 2410 communication, a diagnostic unit 2412, and programmable digital-to-analog converter, analog-to-digital converter and digital input/output block 2414. Thus, controller 2402 may operate as a pure control unit, with the power and drive block 2416 configured to interface with the output switches, inductor, and capacitor via drivers block 2420, although in some embodiments the switches (FETs) may also be included in block 2420. The power and drive section may further include internal voltage conversion circuitry 2418. Finally, the POL regulator may be configured with an independent storage element 2422, which may be configured to store various algorithms and programs executable by power management unit 2404 to perform various power management functions, including efficiency optimization, load current monitoring, adaptive frequency adjustment, diode emulation, and many others.

Although the embodiments above have been described in considerable detail, other versions are possible. Numerous variations and modifications will become apparent to those skilled in the art once the above disclosure is fully appreciated. It is intended that the following claims be interpreted to embrace all such variations and modifications. Note the section headings used herein are for organizational purposes only and are not meant to limit the description provided herein or the claims attached hereto.

We claim:

1. A method for regulating an output of a system, the method comprising:
   adjusting a control parameter based on the output of the system;
   adjusting a first parameter that impacts an operating characteristic of the system, wherein said adjusting the first parameter is performed in response to said adjusting the control parameter yielding a value of the control parameter that is outside a specific range of values of the control parameter; and
   adjusting the output of the system based on the control parameter;
   wherein the specific range of values of the control parameter corresponds to a target level of the operating characteristic of the system with respect to the first parameter.

2. The method of claim 1, wherein the system is a voltage regulator, and the operating characteristic is power efficiency.

3. The method of claim 1, further comprising monitoring the value of the control parameter, wherein said adjusting the first parameter is performed further in response to said monitoring.

4. The method of claim 1, wherein the specific range of values of the control parameter comprises a minimum value, wherein said adjusting the first parameter is performed in response to the value of the control parameter deviating from the minimum value.

5. The method of claim 1, further comprising adjusting one or more additional parameters that impact the operating characteristic of the system, wherein in response to said adjusting the one or more additional parameters, said adjusting the control parameter results in the value of the control parameter residing within a sub-range of values of the control parameter within the specific range of values of the control parameter.

6. The method of claim 5, wherein the sub-range of values of the control parameter corresponds to a target level of the operating characteristic with respect to the first parameter and to the additional parameters.

7. The method of claim 1, wherein said adjusting the output of the system based on the control parameter comprises:
   generating a control signal having a characteristic determined by the control parameter; and
   controlling the output of the system via the control signal.

8. A method for optimizing operation of a feedback system, the method comprising:
   generating a control signal according to a control parameter;
   regulating an output of the feedback system via the control signal;
   monitoring the control parameter; and
   adjusting a present value of a first parameter that affects an operating characteristic of the feedback system, in response to said monitoring indicating that a present value of the control parameter is outside a specific range of values of the control parameter;
   wherein the specific range of values of the control parameter corresponds to a target level of the operating characteristic of the feedback system with respect to the first parameter.

9. The method of claim 8, further comprising adjusting the control parameter based on the output of the feedback system.

10. The method of claim 8, wherein the specific range of values of the control parameter comprises a minimum value of the control parameter at which the control signal is operable to maintain regulation of the output of the feedback system.

11. The method of claim 10, wherein said adjusting is performed until the present value of the control parameter is the minimum value of the control parameter at which the control signal is operable to maintain regulation of the output of the feedback system.

12. The method of claim 8, wherein said adjusting is performed until the present value of the control parameter is within the specific range of values of the control parameter.

13. The method of claim 8, wherein the operating characteristic is power loss of the feedback system.

14. The method of claim 8, further comprising:
   adjusting respective present values of one or more additional parameters that impact the operating characteristic of the feedback system, in response to said monitoring indicating that the present value of the control parameter is outside the specific range of values of the control parameter;
   wherein the specific range of values of the control parameter further corresponds to a target level of the operating characteristic of the feedback system with respect to the one or more additional parameters.

15. The method of claim 14, wherein said adjusting the respective present values of the one or more additional parameters is performed until the present value of the control parameter is within the specific range of values of the control parameter.

16. The method of claim 8, wherein feedback system is a pulse-modulated control system of a voltage regulator, wherein the output of the feedback system is a voltage output of the voltage regulator, wherein the control signal is a pulse-modulated periodic signal, wherein the control parameter is a duty-cycle of the pulse-modulated periodic signal, and wherein the first parameter is one of:
   dead-time;
   gate duration;
   gate voltage;
   switching frequency;
   operating temperature;
   input voltage;

the output voltage of the voltage regulator;
output current of the voltage regulator; and
gate drive current.

17. A system comprising:
an output stage configured to generate an output of the system; and
a control stage configured to:
adjust a control parameter based on the output of the system;
adjust a first parameter that impacts an operating characteristic of the system, in response to the adjusted control parameter having a value outside a specific range of values of the control parameter, until the adjusted control parameter has a value within the specific range of values;
generate a control signal based on the control parameter; and
control the output of the system via the control signal;
wherein the specific range of values of the control parameter corresponds to a target level of the operating characteristic of the system with respect to the first parameter.

18. The system of claim 17, wherein the control stage comprises:
a comparator stage configured to generate a difference signal based on the output of the system and a reference value; and
a parameter control stage configured to adjust the control parameter based on the difference signal.

19. The system of claim 18, wherein the control stage further comprises:
an adjustment stage coupled between the parameter control stage and the output stage, and configured to adjust the first parameter based on the adjusted control parameter.

20. The system of claim 17;
wherein the output stage is an output stage of a voltage regulator;
wherein the output of the system is an output of the voltage regulator;
wherein the control signal is a pulse-width-modulated (PWM) signal;
wherein the control parameter is a duty-cycle of the PWM signal;
wherein the operating characteristic is a power efficiency of the system; and
wherein the first parameter is one of:
dead-time;
gate duration;
gate voltage;
switching frequency;
operating temperature;
input voltage;
the output voltage of the voltage regulator;
output current of the voltage regulator; and
gate drive current.

21. A method to optimize efficiency for low power operation of a voltage regulator, the method comprising:
setting respective present values of one or more parameters to respective initial values, wherein the one or more parameters correspond to one or more respective operating characteristics that impact an efficiency of the voltage regulator;
obtaining a present duty cycle value of a control signal configured to control an output voltage of the voltage regulator;
changing the respective present value of at least one of the one or more parameters by a specified amount in response to the present duty cycle value being different than a most recent previous duty cycle value; and
performing said obtaining and said changing a plurality of times, wherein each time of the plurality of times said changing is performed in a direction that results in decreasing the present duty cycle value.

22. The method of claim 21, further comprising successively changing the respective present value of each of the one or more parameters in response to the present duty cycle value being different than the most recent previous duty cycle value.

23. The method of claim 21, further comprising simultaneously changing the respective present value of each of the one or more parameters in response to the present duty cycle value being different than the most recent previous duty cycle value.

24. A method to optimize efficiency for low power operation of a voltage regulator, the method comprising:
setting a present value of a parameter corresponding to an operating characteristic of the voltage regulator to an initial value;
obtaining a present duty cycle value of a control signal configured to control an output voltage of the voltage regulator;
changing the present value of the parameter by a specified amount in response to the present duty cycle value being different than a most recent previous duty cycle value; and
performing said obtaining and said changing a plurality of times, wherein each time of the plurality of times said changing is performed, said changing is performed in a direction that results in decreasing the present duty cycle value.

25. The method of claim 24, wherein said changing comprises:
in response to the present duty cycle value being higher than the most recent previous duty cycle value:
increasing the present value of the parameter if the present value of the parameter was obtained by decreasing a most recent previous value of the parameter; and
decreasing the present value of the parameter if the present value of the parameter was obtained by increasing the most recent previous value of the parameter; and
in response to the present duty cycle value being lower than a most recent previous duty cycle value:
decreasing the present value of the parameter if the present value of the parameter was obtained by decreasing the most recent previous value of the parameter; and
increasing the present value of the parameter if the present value of the parameter was obtained by increasing the most recent previous value of the parameter.

26. The method of claim 24, further comprising adding constraints to limit a scope of said changing to be within specified bounds.

* * * * *